(No Model.)

T. ROBINS, Jr.
CONVEYER BELT.

No. 499,472.  Patented June 13, 1893.

UNITED STATES PATENT OFFICE.

THOMAS ROBINS, JR., OF MORRISTOWN, NEW JERSEY.

CONVEYER-BELT.

SPECIFICATION forming part of Letters Patent No. 499,472, dated June 13, 1893.

Application filed September 9, 1892. Serial No. 445,406. (No model.)

*To all whom it may concern:*

Be it known that I, THOMAS ROBINS, Jr., of Morristown, New Jersey, have invented certain new and useful Improvements in Conveyer-Belts, of which the following is a description, reference being taken to the accompanying drawings, which form part of this specification.

My invention is an improvement in belts for conveyers and analogous uses and it consists primarily in thickening the central portion of the facing, extending it as far as may be desired toward the edge of the belts; in providing the rubber or composition facing of the belt with beveled, thinned or attenuated edges; and in beveling the edges of the supplemental or thickened portion. There is thereby formed a belt which will have a thickened center and thinner or attenuated side portions, the latter terminating in beveled edges. When the belt is run over conical or inclined pulleys which convert the belt in a moving trough or channel, the thickened or raised portion will form the bottom of such trough or channel and will be better adapted to stand excessive wear which necessarily occurs along the center line of the belt, while the beveled edges of the thinner side portions will more readily pass any stationary object without catching or tearing the rubber facing.

It has heretofore been customary, so far as I am aware, to make the backing of belts of strong and stout material, such as successive layers of canvas, and to face such backing with a composition of rubber or other tough, flexible, and somewhat elastic, substance. The edges of this facing being rectangular, are continually caught and torn as they pass any rough objects that may come in contact with them. At the same time the ore coming in contact more directly with the center of the belt cuts through and wears out the central part long before the lateral surfaces are worn through. By my invention I do away with the tearing likely to occur at the edges of the belt and by my thickened and raised central portion I resist for a longer period the excessive wear along that line, and more uniformly distribute the ore upon each side of the center. By so doing I make the wear upon each portion very closely proportional to its thickness and therefore get the maximum amount of wear out of the given amount of material, greatly increasing the life of a given-weight belt and reducing the cost of renewals.

Such briefly is my present invention. One embodiment is illustrated in the accompanying drawings wherein—

Figure 1:
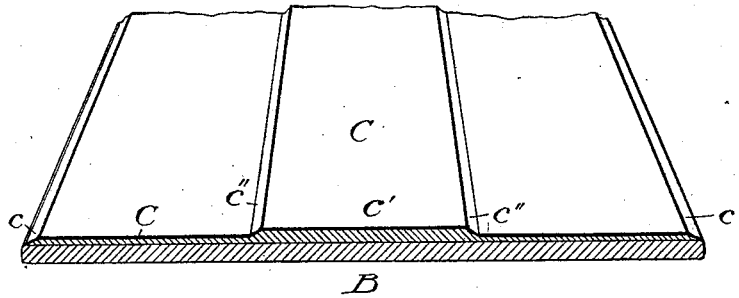
Figure 2:
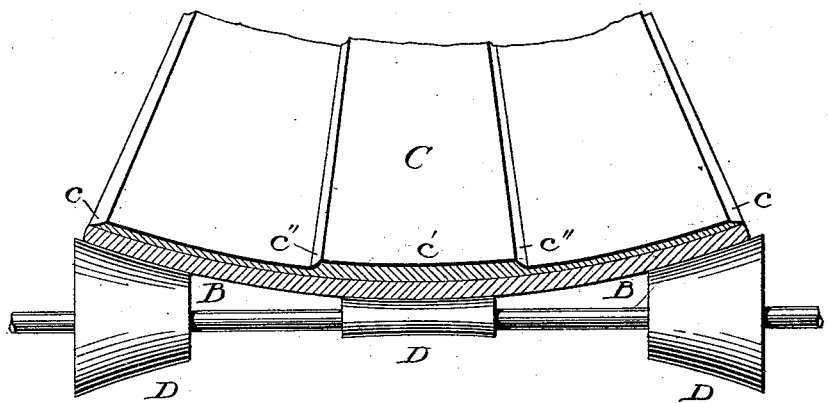

Figure 1 is a perspective, broken away at the rear and showing cross section in front, of a belt made in accordance with my invention, and Fig. 2, shows the same belt mounted upon its supporting pulleys and forming the conveyer trough or channel.

At B is indicated the backing which sustains the tensile strains of the belt and forms a support for the composition facing C. The supporting pulleys are lettered D. The edges of the facing are beveled off at $c$, so that when the belt is on the pulleys, as in Fig. 2, these bevels are approximately horizontal. The thickened and raised central portion is indicated at $c'$ and may extend as far toward the edges as desired, though I prefer to make it one third the width of the belt. The bevels of this thicker portion are shown at $c''$. It will be seen in Fig. 2 that slight troughs or channels are formed by these bevels at each side of the central strip. These channels serve to assist in distributing the ore upon the belt; for as the ore accumulates upon the raised center and falls to the sides it fills up these portions before accumulating at the edges of the belt.

In manufacturing the belts I may make the whole facing of one integral piece; in which case the beveled portions will become curves instead of straight lines; or, on the other hand, I may make the broader facing of one strip, and the raised portion of a second strip, and then vulcanize or otherwise blend or unite the two.

I have now fully described my invention, with one embodiment of it, and therefore, without detailing a number of slight modifications which may be made without departing from its principles, I claim as my own and desire to secure by these Letters Patent the following:

1. As an article of manufacture, a conveyer belt having a thick central portion and thinner or attenuated side portions having beveled or attenuated edges, substantially as, and for the purposes, set forth.

2. As an article of manufacture, a facing for conveyer or other belts presenting in cross-section a thick central portion and thinner or attenuated side portions, whereby the life and wear of the belt may be increased to the maximum for a given amount of material, substantially as, and for the purposes, set forth.

3. As an article of manufacture, a conveyer belt consisting of a backing, and a facing secured thereto and provided with a raised or thickened central portion and thinner or attenuated side portions, the said thickened portion being beveled or tapered down into the said thinner or attenuated side portions, whereby the life and wear of the belt may be increased to the maximum for a given amount of facing material, substantially as, and for the purposes, set forth.

In testimony whereof I have hereto set my hand this 18th day of August, 1892.

THOMAS ROBINS, JR.

Witnesses:
WALDORF H. PHILLIPS,
HAROLD BINNEY.